Dec. 20, 1966   G. RESTALL   3,292,949
LOCKING MECHANISMS FOR HITCHES
Filed Dec. 30, 1964   3 Sheets-Sheet 1
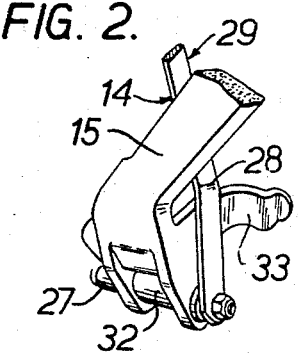
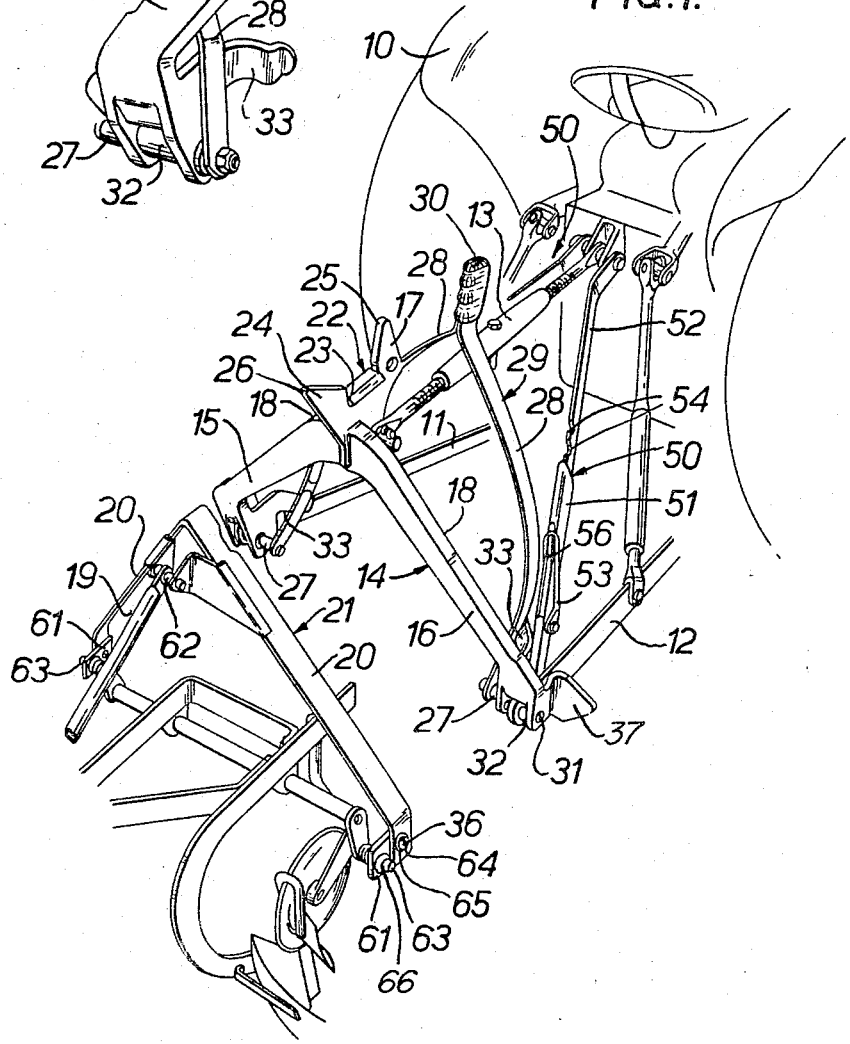

Dec. 20, 1966   G. RESTALL   3,292,949
LOCKING MECHANISMS FOR HITCHES
Filed Dec. 30, 1964   3 Sheets-Sheet 2

United States Patent Office 3,292,949
Patented Dec. 20, 1966

3,292,949
LOCKING MECHANISMS FOR HITCHES
George Restall, Sutton Coldfield, England, assignor to Rubery, Owen and Company Limited, Wednesbury, Staffordshire, England, a British company
Filed Dec. 30, 1964, Ser. No. 422,332
Claims priority, application Great Britain, Dec. 30, 1963, 44,104/63; Dec. 31, 1963, 51,296/63; Jan. 4, 1964, 474/64; Jan. 18, 1964, 2,321/64; Feb. 12, 1964, 5,834/64
22 Claims. (Cl. 280—479)

The invention relates to improvements in hitches for coupling a tractor or other powered vehicle to a vehicle, implement, load or the like adapted to be towed, pushed and/or guided or otherwise handled by the powered vehicle.

According to one feature of our invention, in a hitch the coupling or a part of the coupling is formed by aligned pins passing through or into parts to be connected, and the pins are carried by the free ends of a lever of wishbone or inverted U or V outline which is angularly movable about the pins as an axis, the limbs of the lever co-operating with relatively stationary cams, ramps or equivalent members which on angular movement of the lever cause the pins to be moved towards or away from each other.

This means for operating the pins simplifies and expedites the engagement and release of the coupling means and is simple to operate and is not liable to be damaged by mishandling.

The lever is conveniently made from spring steel or like material so that the limbs can be readily displaced towards or away from each other by engagement with the cams or ramps and return to their normal position due to spring action.

In known hitches a hitch frame mounted on the tractor is usually adapted to be attached to a three point linkage of the tractor of which a pair of draft links operated by power means on the tractor lie substantially in the same horizontal plane for raising and lowering the frame, and the third link is centrally disposed above the draft links and is adjustable to control the forward tilt of the implement.

Such three point linkages usually incorporate a pair of stays which are pivotally attached at one end to the tractor and pivotally attached at the other end to the free end of the lower links or to a member such as a drawbar connecting the lower links together. The stays in operation serve to take the weight off the hydraulics of the tractor and comprise telescopic members which are extended or contracted when the lower links are lowered or raised. Bolts or pins are detachable engageable with co-operating holes in the members to lock the stays and the draft links in position when the draft links are at the desired working height. This locks the draft links against accidental movement by operation of the power means thereby ensuring that should the power means fail in service, the draft links will be held in their working position.

According to another feature of the invention in which the tractor is adapted to carry a frame which can be manipulated by power means and which is adapted to be engaged with or coupled to a complementary frame mounted on the implement, the tractor frame is attached to a three point linkage of the tractor and there is provided at least one stay pivotally carried at one end in the tractor and at the other end in fixed pivotal relationship to the frame, the stay being adjustable in length to permit raising the lowering of the frame, and the stay being locked against adjusting movement by means which permit the frame to be raised and which are manually releasable from the driver's seat of the tractor to permit the frame to be lowered by angular movement of the lever of wishbone or inverted U or V outline referred to above about the axis formed by the pins carried by its free ends which effect the coupling or a part of the coupling of the hitch frame.

The or each stay comprises a pair of telescopic members and on one of the members is pivotally mounted a pawl which normally engages with serrations on the other member and is moved out of engagement with the serrations by movement of the lever to permit lowering of the frame.

Several forms of hitches embodying our invention are illustrated in the accompanying drawings in which:

FIGURE 1 is a perspective view of one form of tractor-implement arrangement prior to coupling;

FIGURE 2 is a perspective view on an enlarged scale of the lower end of a limb of the tractor hitch frame illustrated in FIGURE 1;

Figure 7:
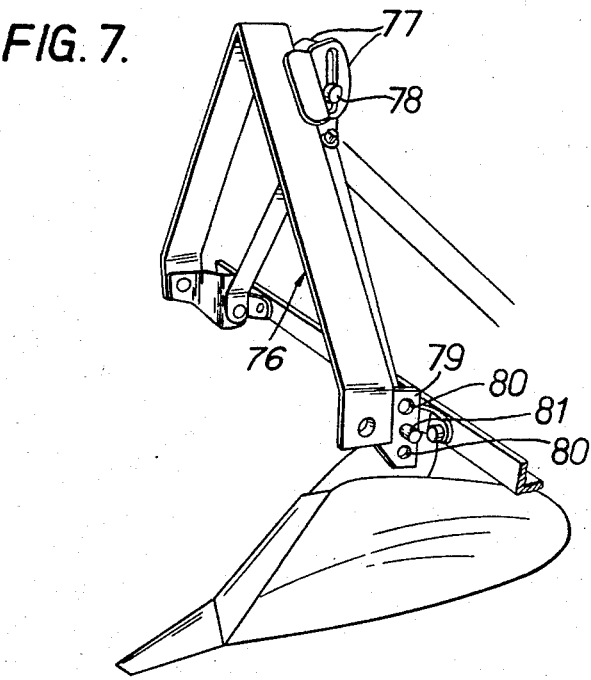
FIGURE 7 is a perspective view of an alternative implement hitch frame.

In the arrangement shown in FIGURE 1, 10 is a tractor or other powered vehicle having a power-operated three point linkage comprising two rearwardly extending draft links 11, 12 which lie in substantially the same horizontal plane and which can be raised and lowered by power means on the tractor, and an upper link 13 centrally disposed above the draft links and adjustable in length. A hitch frame 14 of substantially inverted U or V outline is pivotally attached at or adjacent to the free end of its limbs 15, 16 to the draft links. The limbs comprise opposed side portions which converge upwardly and at their upper ends are welded or otherwise secured to a plate 17 forming the apex of the frame. The frame at its apex is pivotally attached to the outer end of the upper link 13 whose length is adjusted so that the frame is maintained in a substantially vertical plane.

The outer sides of the limbs of the tractor hitch frame 14 provide lateral bearing surfaces 18 adapted to engage with corresponding bearing surfaces 19 defined by the inner surface of limbs 20 of a co-operating inverted U or V frame 21 mounted on an implement or load which is to be coupled to the tractor.

A notch 22 formed in the plate 17 at the apex of the tractor hitch frame 14 is defined between an inner straight vertical edge 23 of an upwardly and rearwardly extending hook 24 and a substantially vertical edge of an upwardly extending forward portion 25. The straight vertical edge 23 leads into a rearwardly inclined edge 26 extending to the top of the hook. The dimensions of the notch are chosen so that it receives the apex of the implement frame 21 when the implement is coupled to the tractor.

This is achieved by lowering the tractor frame 14 and reversing the tractor up to the implement until the tractor frame enters the implement frame 21. The tractor frame is then raised and the frames are engaged with the apex of the implement frame being received in the notch 22.

The hitch is provided with means which are operable from the tractor seat to lock together the frames at or adjacent to the free ends of their limbs. In the embodiment illustrated in FIGURES 1 and 2 axially aligned pins 27 carried by the free ends of the limbs 28 of a lever 29 of wishbone or inverted U or V outline extend outwards on opposite sides of the lever and are received in aligned holes 31 drilled in the limbs of the tractor frame adjacent to their free ends. The pins pass through ball connections in the free ends of the draft links 11, 12 and form the means for pivotally connecting the free ends of the limbs 15, 16 to the draft links. The lever is made from spring steel or other suitable resilient material. The limbs of the lever adjacent to their free ends are substantially parallel and lead into portions which converge into an apex at which point the limbs lead into co-operating straight portions which are secured together to form a handle 30. Where the free ends of the limbs of the tractor frame are of bifurcated form as illustrated the pins 27 work in bushes 32 secured between the bifurcated ends of the limbs. The lever is angularly movable about an axis formed by the pins rotating in the holes and the bushes in the frame. A pair of spaced cams 33 or equivalent members of substantially S outline mounted on the forward side portions of the tractor frame and extending inwardly towards one another are engaged by the limbs of the lever 29 when the lever is moved angularly about its axis and away from the frame. The pins normally project on opposite sides of the frame. Upon angular movement of the lever away from the frame the limbs of the lever co-operate with the cam members to urge the limbs towards each other and rotate and withdraw the pins to a position in which their outer ends are flush with the outer surface of the frame. The lever is retained in this position by the resilience of the material of the lever which holds it in engagement with the cams.

When the tractor and the implement or load are to be coupled as described above, the lever 29 is moved angularly away from the frame to a position in which the pins are withdrawn. After coupling has taken place as described above the lever 29 is then moved angularly in the opposite direction towards the engaged frames and the pins are moved outwardly and are received in co-operating holes 36 provided in the limbs of the implement frame 21. To ensure that the holes in the two frames are in correct horizontal alignment before operating the lever it is desirable to provide on each limb of the tractor frame adjacent to its free end a locating plate 37 with which the end of the side portion of the implement frame engages. The locating plates may be attached to the frame separately or may be formed as integral outward extensions of the cam members or the frame.

To uncouple the implement from the tractor the lower ends of the frames are unlocked by angular movement of the lever 29 in the reverse direction to withdraw the pins. The frames are then disengaged by lowering the tractor frame and moving the tractor forward.

In the foregoing embodiments it will be appreciated that by arranging for the lower ends of the frames to be coupled in alignment with the ball connections of the draft links 11, 12 of the tractor this ensures that no undesirable weight transfer is caused during tillage and load carrying which might distort or impose undesirable forces on the frames and mechnaism of the power operated hitch mechanism.

Figure 3:
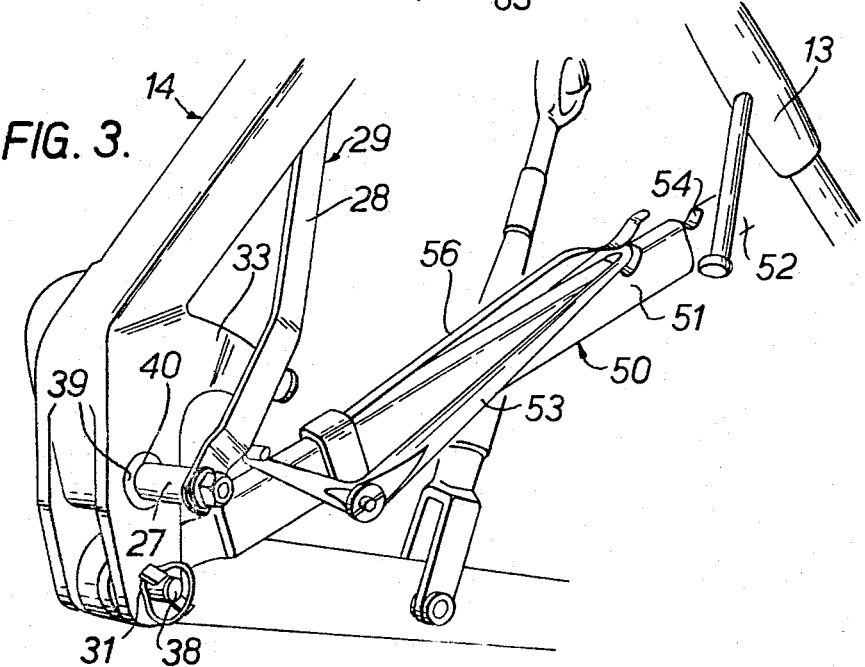
FIGURE 3 is a perspective view on an enlarged scale of a lower limb of the tractor hitch frame illustrated in FIGURE 1 showing a modification and showing one of the stays incorporated in that embodiment.

In the modification shown in FIGURE 3 where corresponding reference numerals have been used to indicate corresponding parts, the lower ends of the limbs of the tractor hitch frame 14 are connected to the draft links by detachable pins 38 passing through the aligned holes 31 and the ball connections of the draft links.

The pins 27 carried by the free ends of the limbs 28 of the lever 29 are received in bushes 39 aligned holes 40 in the limbs of the frame positioned adjacent to their free ends and above the holes 31.

As illustrated in FIGURE 1 there is connected between the point at which the ball connections of the draft links are connected to the tractor frame 14 and attachment points on the tractor on opposite sides of the attachment point for the upper link 13 a pair of telescopic stays 50 of which one is shown on an enlarged scale in FIGURE 3. Each stay comprises a pair of telescopic members 51, 52 slidably arranged one inside the other. The free ends of the outer members 51 are connected to the ball connections of the draft links by the pins or bushes which connect the free ends of the limbs of the tractor frame to them. Pivotally mounted on each outer member 51 is a pawl 53 which is normally held in engagement with any one of a series of serrations 54 in the form of ratchet teeth on the upper surface of the inner member 52 by a leaf spring 56 mounted on the outer member. The pawls are moved out of engagement with the ratchet teeth to permit lowering of the tractor frame 14 by angular movement of the lever 29 about the pins 27 as an axis as described in any of the foregoing embodiments.

The ratchet teeth are of such a form that the pawls can ride over them when the tractor frame is being raised but which prevent it from being lowered except on operation of the lever to release the pawls.

This has the advantage that locking of the stays takes place simultaneously with locking together of the free ends of the limbs of the tractor and implement frames from the tractor seat. The stays cannot be released except upon manual operation of the lever from the tractor seat.

In any of the embodiments described above the frame 21 adapted to be attached to the implement is normally detachably mounted on existing attachment points on the vehicle or implement and it will be appreciated that the location and spacing of these points may vary with individual vehicles or implements. It may be necessary therefore to provide for each particular implement a special frame adapted to co-operate with the existing attachment points.

This difficulty is overcome in the embodiment illustrated in FIGURE 1 by providing at the lower end of each limb 20 of the implement frame an arm 61 which is pivoted to the frame so that the position of its free end can be adjusted to suit the position of the attachment point on the implement to which it is to be connected.

In the embodiment of FIGURE 1 the frame 21 is adapted to be mounted on the vehicle or implement by a single attachment mounting 62 at or adjacent the apex of the frame and attachment mountings 63 in the free ends of the arms pivotally connected to the free ends of the limbs of the frame.

The angular movable arms 61 bear against the inner faces of the limbs 19, 20 to which they are pivotally connected by bushings 64 passing through aligned holes in the limbs and the arms. The pins 27 for locking the lower ends of the frames work through the bushings. The bushes have integral flanges 65 and the inner face of each flange bears against the outer face of its limb and the bushes are welded or otherwise secured at their inner ends to the angularly movable arms.

When attaching the frame to the vehicle or implement the mounting 62 at the apex of the frame is engaged with a corresponding attachment point on the vehicle and the arms 61 are moved angularly about their pivots until holes 66 in their free ends are in alignment with lower attachment fittings on opposite sides of the implement and to which they are detachably secured by known means.

Figure 4:
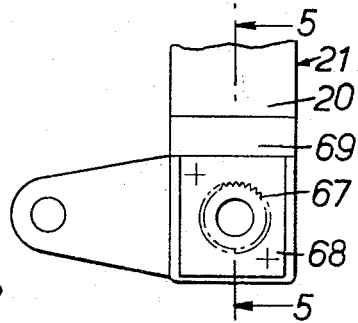
FIGURE 4 is a side elevation of the lower end of a limb of the implement hitch frame.
Figure 5:
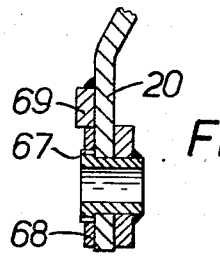
FIGURE 5 is a section on the line 5—5 of FIGURE 4.

The arms are retained in this position so that the frame is maintained substantially rigid and will not distort by an appreciable amount when the implement is connected to the towing vehicle. This is achieved in one arrangement as illustrated in FIGURES 4 and 5 by forming on the flanges 65 of the bushes peripheral serrations 67 which are adapted to engage with corresponding serrations in a detachable plate 68 which fits over the flange and is retained against rotation by engagement with stop plates 69 on the limbs, the plates being retained against the outer surface of the limbs by catch plates or grub screws (not shown).

Figure 6:
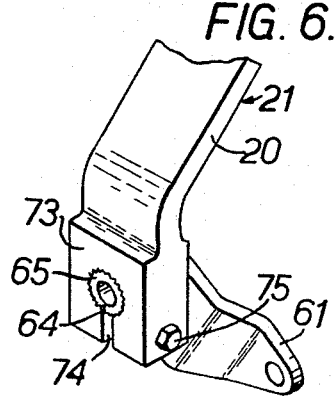
FIGURE 6 is a perspective view similar to the arrangement shown in FIGURES 4 and 5 inclusive but showing a modification.

In another arrangement illustrated in FIGURE 6 a plate 73 is integral with or welded or otherwise secured to the free end of each limb and the arms 61 are detachably connected to the plates in a pivotal manner by the bushes 64 which are secured at their inner ends to the arms and have at their outer ends the integral flanges 65 adapted to mesh with corresponding teeth formed around the peripheries of openings in the plates. The lower portion of each plate 73 is split into two parts by a slot 74 so that the parts can be readily moved apart and the teeth disengaged to permit angular movement of the arms relative to the limbs. The parts of each plate can be urged together by a cotter pin 75 to force the teeth in the plates into engagement with the toothed wheel on the bush and so lock the arm relative to its limb.

When the frame is to be attached to a plough it is desirable that the means for mounting the frame at its apex to the corresponding attachment point on the plough permits slight angular movement of the frame to take place without distortion when furrow adjustment of the plough is being carried out.

An alternative construction of implement hitch frame shown in FIGURE 7 is provided with means which co-operate with attachment points on the implement by which the frame can be mounted on the implement in any one of a series of positions.

This enables the working height of the implement above the ground to be adjusted and is of particular advantage where the frame is to be mounted on a tillage implement.

As illustrated the frame 76 is adapted to be mounted on an implement by a singal attachment fitting at or adjacent to the apex of the frame and attachment fittings at the free ends of the limbs of the frame. The attachment fitting at the apex of the frame comprises a pair of rearwardly extending spaced plates 77 which are welded to the frame and between which the upper attachment point on the implement is received. The attachment point is secured to the plates by a removable pin 78 passing through vertical slots in the plates.

The lower attachment fittings comprise rearwardly extending plates 79 welded or otherwise secured to the inner faces of the lower ends of the limbs and in which are drilled a series of holes 80 of which corresponding holes in each plate are in alignment and the holes are substantially parallel to the ends of the limbs. The plates co-operate with the lower attachment points on the implement or vehicle to which each of the plates is releasably connected by a detachable pin 81 passing through one of the holes in each plate. The hole 80 chosen determines the height at which the frame is mounted on the vehicle or implement and this height can be selected within a range determined by the number of holes within the plates and the spacing of the holes.

Preferably there are three holes 80 in each plate 79 providing attachment at three differment heights.

The plates 79 at the lower ends of the limbs bear against the lower attachment points on the vehicle or implement and the plates may be straight or as illustrated are joggled towards each other according to the spacing of the attachment points.

The various forms of hitch described above have been described and illustrated by way of example with reference to the mounting of a hitch frame on the rear end of a tractor. It is to be understood however that the invention is not so limited and the tractor hitch frame can be mounted if desired on the front end of a tractor provided with power operated means for raising and lowering the frame. In this arrangement the lower ends of the limbs of the frame can be locked as described with reference to the embodiments of FIGURES 1–3 inclusive, by means operable by the driver from the tractor seat through a suitable linkage or cable arrangement.

It is desirable to be able to use a tractor when fittted with a hitch frame for towing trailed implements or other equipment as opposed to fully mounted implements without having to first detach the hitch frame from the tractor. At the same time it is desirable to be able to couple and uncouple the tractor and towed implement automatically by means operable by the driver from the tractor seat.

Figure 8:
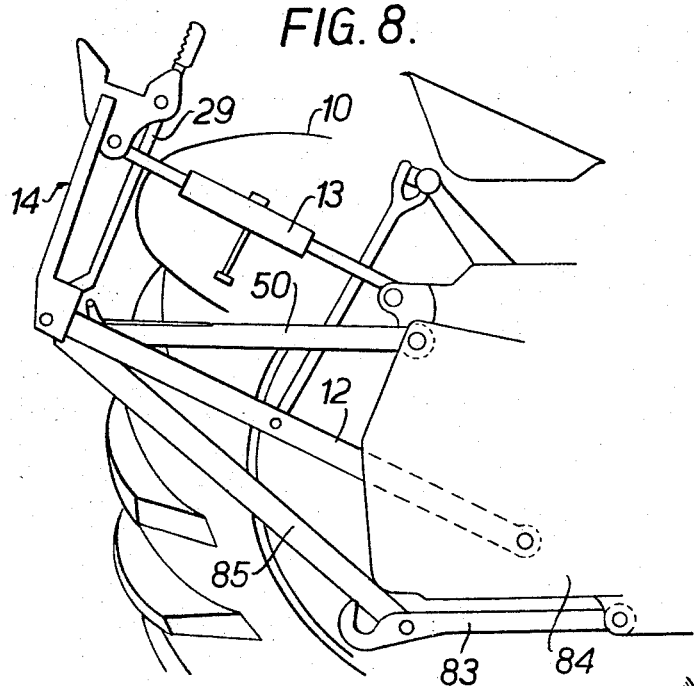
FIGURE 8 is a side elevation similar to the tractor shown in FIGURE 1 but showing a modification.

FIGURE 8 shows a tractor having a hitch frame similar to the arrangement shown in FIGURE 1 and corresponding reference numerals have been used to indicate corresponding parts. As illustrated a hook member 83 pivotally mounted on the tractor under the differential casing 84 of the axle is connected by the members 85 to the points on the tractor hitch frame 14 by which the latter is connected to the draft links 11, 12 and the telescopic stays 50.

The tie members 85 may be in the form of rigid bars or alternatively they may be formed by chains.

To connect the tractor to the implement to be towed the hook member 83 is lowered by lowering the hitch frame 14 upon operation of the tractor's power operated linkage. This moves the arm of the hook member 83 angularly about its pivot on the tractor after first releasing the telescopic stays 50 by angular movement of the lever 29. The tractor is then reversed up to the trailed implement and the hook is positioned under the co-operating part on the tow bar of the trailed implement which may comprise a ring hitch member (not shown). By raising the hitch frame 24, the hook automatically engages the ring hitch member for effecting the coupling.

Although we have referred in the specification and claims to the terms "tractor" and "implement" it is to be understood the term "tractor" is to be construed as including any powered vehicle having at its rear or front end a power operated linkage, and the term "implement" is to be construed as including any device, machine, vehicle, load or the like which is to be raised, lowered towed or otherwise manipulated by the tractor.

I claim:
1. A hitch for coupling a tractor to an implement comprising a first hitch member adapted to be connected to the tractor and a second hitch member adapted to be connector to the implement, the hitch members having co-operating parts which are to be connected, aligned pins passing through and into the co-operating parts to be connected, an angularly movable lever having opposed limbs in the free ends of which the aligned pins are carried, said lever being angularly movable about the pins as an axis, and relatively stationary cam means co-operating with the limbs of the lever to move the pins towards or away from each other upon angular movement of the lever.

2. A hitch for coupling a tractor to an implement comprising a first hitch frame adapted to be connected to the tractor and to be raised or lowered thereby in a substantially vertical plane, a second hitch frame adapted to be connected to the implement, said hitch frames adapted to be engaged by relative movement between them, co-operating parts on the hitch frames adapted to be connected when the hitch frames are engaged, aligned pins passing through and into the co-operating parts on the frames to be connected, an angularly movable lever of substantially wishbone outline having opposed limbs in the free ends of which the aligned pins are carried, said lever being angularly movable about the pins as an axis, relatively stationary cam means carried by one of the frames and co-operating with the limbs of said lever to move the pins towards or away from each other upon angular movement of said lever about the pins as the axis.

3. A hitch as claimed in claim 2, wherein the co-operation of the pins in the parts to be connected is affected when the lever is moved out of engagement with the cam means and the pins are moved towards each other.

4. A hitch for coupling a tractor to an implement comprising a first hitch frame adapted to be connected to the tractor and to be raised and lowered in a substantially vertical plane by power operated means on the tractor, the tractor hitch frame having two opposed side portions converging upwardly to an apex, each side portion having an outwardly facing aligning surface, a second hitch frame adapted to be connected to the implement, the implement hitch frame having two opposed side portions converging upwardly to an apex of which the convergence of the side portions conforms substantially to the convergence of the side portions of the tractor frame, each of the side portions of the implement frame having an inwardly facing aligning surface adapted to receive and overlap the corresponding aligning surface of the tractor hitch frame, projecting means at the apex of the tractor frame adapted to pass through the apex of the implement frame when the tractor frame is inserted into the implement frame and thereafter when the tractor frame is raised relative to the implement frame to guide the implement frame into nesting engagement with the tractor frame with the aligning surfaces on the two frames in lapping engagement, pins working through aligned holes adjacent to the lower ends of the side portions of the tractor frame, a lever of substantially wishbone outline having opposed limbs in the free ends of which said pins are carried, said lever being angularly movable about the pins as an axis, cam means carried by said lower ends of the side portions of said tractor frame for co-operation with the limbs of said lever, said pins being movable in opposite directions and received in holes in the lower ends of the side portions of said implement frame in alignment with the holes in the tractor frame when the frames are in nesting engagement to connect the lower ends of the side portions of the frames, the pins being moved by angular movement of the lever about the pins and the co-operation of the limbs of the lever with the cam means.

5. A hitch for connecting an implement to a tractor having a power operated three point linkage comprising two draft links which lie in substantially the same horizontal plane and which can be raised and lowered by power means on the tractor, and an upper link centrally disposed above the draft links, said hitch comprising a first hitch frame adapted to be connected to the three point linkage of the tractor, and a second frame adapted to be mounted on the implement; the tractor hitch frame having two opposed side portions converging upwardly to an apex, end side portions having an outwardly facing aligning surface, a pivotal connection at the apex of the tractor frame for connection to the upper link of the tractor's three point linkage, bifurcated portions at the lower ends of the side portions of the tractor frame to receive the draft links of the tractor's three point linkage, pins working through aligned holes in said bifurcated portions and through ball connections at the outer ends of said draft links, a lever of substantially wishbone outline having opposed limbs in the free end of which said pins are carried, said lever being angularly movable about the pins as an axis, cam means carried by the side portions of the tractor frame adjacent to bifurcated portions for co-operation with the limbs of the lever, said pins being movable by co-operation of the limbs of the lever with the cam means from a first position in which their outer ends are flush with the aligning surfaces of the frame to a second position in which their outer ends project from said aligning surfaces upon angular movement of the lever about the pins as the axis; the implement hitch frame having two opposed side portions converging upwardly to an apex of which the convergence of the side portions conforms substantially to the convergence of the side portions of the tractor frame, each of the side portions of the implement frame having an inwardly facing aligning surface adapted to receive and overlap the corresponding aligning surface of the tractor hitch frame; a hook member at the apex of the tractor frame adapted to pass through the apex of the implement frame when the tractor frame is inserted into the implement frame, a notch in the hook member in which the apex of the implement frame is received when the tractor frame is raised relative to the implement frame to guide the implement frame into nesting engagement with the tractor frame with the aligning surfaces on the two frames in lapping engagement, wherein said lever is moved angularly about the pins as the axis and the pins are moved outwardly from said first position into said second position in which the pins at their outer ends are received in holes in the lower ends of the side portions of the implement frames to connect the lower ends of the side portions of the frames.

6. A hitch as claimed in claim 5, wherein bushes are located in the aligned holes in said bifurcated portions of said tractor frame and pass through the ball connections of said draft links, said pins working through the bushes.

7. A hitch as claimed in claim 5, wherein said angularly movable lever is made from spring steel, and its limbs adjacent to their free ends are substantially parallel and lead into portions which converge into an apex at which point the limbs lead into co-operating straight portions which are secured together to form an operating handle.

8. A hitch for coupling a tractor to an implement comprising a first hitch frame adapted to be connected to the tractor and to be raised or lowered thereby in a substantially vertical plane, a second hitch frame adapted to be connected to the implement, said hitch frames adapted to be engaged by relative movement between them, co-operating parts on the hitch frames at their lower ends adapted to be connected when the hitch frames are engaged, aligned pins working in the co-operating parts on the tractor frame and passing through and into the co-operating parts on the implement frame to connect the co-operating parts, an angularly movable lever of substantially wishbone outline having opposed limbs in the free ends of which the aligned pins are carried, said lever being angularly movable about the pins as an axis, cam means carried by the tractor frame and co-operating with the limbs of the lever to move the pins in opposite directions to connect together said co-operating parts upon angular movement of the lever about the pins, at least one stay pivotally carried at one end by the tractor and at the other end in fixed pivotal relationship with the tractor frame, said stay being adjustable in length to permit raising and lowering of the tractor frame, means incorporated in the stay to permit the tractor frame to be raised but which automatically lock the stay to prevent accidental lowering of the frame, said locking means co-operating with said angularly movable lever and being readily releasable by angular movement of the lever about the pins to permit the tractor frame to be lowered.

9. A hitch for coupling a tractor to an implement comprising a first hitch frame adapted to be connected to the tractor and to be raised and lowered in a substantially vertical plane by power operated means on the tractor, the tractor hitch frame having two opposed side portions converging upwardly to an apex, each side portion having an outwardly facing aligning surface, a second hitch frame adapted to be connected to the implement, the implement hitch frame having two opposed side portions converging upwardly to an apex of which the convergence of the side portions conforms substantially to the convergence of the side portions of the tractor frame, each of the side portions of the implement frame having an inwardly facing aligning surface adapted to receive and overlap the corresponding aligning surface of the tractor hitch frame, projecting means at the apex of the tractor frame adapted to pass through the apex of the implement frame when the tractor frame is inserted into the implement frame and thereafter when the tractor frame is raised relative to the implement frame to guide the implement frame into nesting engagement with the tractor frame with the aligning surfaces on the two frames in lapping engagement, pins working through aligned holes adjacent to the lower ends of the side portions of the tractor frame, a lever of substantially wishbone outline having opposed limbs in the free ends of which said pins are carried, said lever being angularly movable about the pins as an axis, cam means carried by said lower ends of the side portions of said tractor frame for co-operation with the limbs of said lever, said pins being movable in opposite directions and received in holes in the lower ends of the side portions of said implement frame in alignment with the holes in the tractor frame when the frames are in nesting engagement to connect the lower ends of the side portions of the frames, the pins being moved by angular movement of the lever about the pins and the co-operation of the limbs of the lever with the cam means; a stay connected between the lower end of each side portion of the tractor frame and a point on the tractor adjacent to its power operated means, each stay being adjustable in length to permit raising and lowering of the tractor frame, means incorporated in each stay to permit the tractor frame to be raised but which automatically lock each stay to prevent accidental lowering of the frame, said locking means co-operating with said angularly movable lever and being readily releasable by angular movement of the lever about the pins to permit the tractor frame to be lowered.

10. A hitch as claimed in claim 9, wherein each stay comprises a pair of telescopic members, and on one of the members is pivotally mounted a pawl normally engaging ratchet teeth on the other member, said pawl being movable out of engagement with the said ratchet teeth to permit lowering of the frame by angular movement of said lever about the pins.

11. A hitch as claimed in claim 10, and further including a leaf spring mounted on the member on which the pawl is mounted to hold said pawl in engagement with the ratchet on said other member.

12. A hitch for coupling a tractor to an implement comprising a first hitch member in the form of a hook member pivotally mounted on the tractor, a frame member mounted on the tractor and adapted to be raised or lowered by power operated means on the tractor, at least one tie member connecting said hook member to a point on said frame member whereby said hook member is raised and lowered by raising and lowering said frame member, aligned pins working in holes in said frame member, an angularly movable lever having opposed limbs in the free ends of which the aligned pins are carried, said lever being angularly movable about the pins as an axis, cam means carried by the frame member and co-operating with the limbs of the lever to move the pins in opposite directions on angular movement of the lever about the pins, at least one stay pivotally carried at one end by the tractor and at the other end in fixed pivotal relationship with the frame member, said stay being adjustable in length to permit raising and lowering of the frame, means incorporated in the stay to permit the tractor frame to be raised but which automatically lock the stay to prevent accidental lowering of the frame, said locking means co-operating with said angularly movable lever and being releasable by angular movement of the lever about the pins to permit the tractor frame to be lowered, and a second hitch member adapted to be connected to the implement and engageable and disengageable with said tractor hitch member upon raising and lowering said tractor frame.

13. A hitch as claimed in claim 12, wherein said implement hitch member comprises a tow bar.

14. A hitch as claimed in claim 12, wherein said tie member comprises a rigid bar.

15. A hitch as claimed in claim 12, wherein said tie member comprises a chain.

16. A hitch for coupling a tractor to an implement comprising a first hitch frame adapted to be connected to the tractor and to be raised and lowered in a substantially vertical plane by power operated means on the tractor, the tractor hitch frame having two opposed side portions converging upwardly to an apex, each side portion having an outwardly facing aligning surface, a second hitch frame adapted to be connected to the implement, the implement hitch frame having two opposed side portions converging upwardly to an apex of which of the convergence of the side portions conforms substantially to the convergence of the side portions of the tractor frame, each of the side portions of the implement frame having an inwardly facing aligning surface adapted to receive and overlap the corresponding aligning surface of the tractor hitch frame, means for connecting the implement frame at its apex to the implement, means for connecting the free ends of the side portions of the implement frame to two attachment points on the implement comprising arms each pivotally connected at one end to the free end of a side portion of the implement frame, whereby the position of the free end of said arm can be adjusted to suit the attachment point on the implement to which it is to be connected; projecting means at the apex of the tractor frame adapted to pass through the apex of the implement frame when the tractor frame is inserted into the implement frame and thereafter when the tractor frame is raised relative to the implement frame to guide the implement frame into nesting engagement with the tractor frame with the aligning surfaces on the two frames in lapping engagement, pins working through aligned holes adjacent to the lower ends of the side portions of the tractor frame, a lever of substantially wishbone outline having opposed lambs in the free ends of which said pins are carried, said lever being angularly movable about the pins as an axis, cam means carried by said lower ends of the side portions of said tractor frame for co-operation with the limbs of said lever, said pins being movable in opposite directions and received in holes in the lower ends of the side portions of said implement frame in alignment with the holes in the tractor frame when the frames are in nesting engagement to connect the lower ends of the side portions of the frames, the pins being moved by angular movement of the lever about the pins and the co-operation of the limbs of the lever with the cam means.

17. A hitch as claimed in claim 16, and further including means for locking the angularly movable arms in any desired angular position.

18. A hitch as claimed in claim 16, wherein bushings passing through aligned holes in the side portions of the implement frame and the arms connect the arms to the frame, and the arms bear against the faces of the side portions, the pins carried by the free ends of the limbs of the angularly movable lever are received in the bushings when the frames are connected, flanges integral with the bushings of which the inner face of each flange bears against the outer face of its side portion of the implement frame, peripheral serrations on the flanges of the bushings, and detachable plates adapted to fit over the flanges and retained against rotation by stop means are provided with serrations with which said peripheral serrations on the flanges are adapted to co-operate.

19. A hitch as claimed in claim 16, wherein bushings passing through aligned holes in the side portions of the implement frame and the arms connect the arms to the frame, the links being secured at their inner ends to the arms, and the arms bear against the inner faces of the side portions, the pins carried by the free ends of the limbs of the angularly movable lever are received in the bushings when the frames are connected, flanges integral with the bushings of which the inner face of each flange bears against the outer face of its side portion of the implement frame, peripheral serrations on the flanges on the bushings, peripheral serrations around the peripheries of openings in the side portion of the frame through which pass said bushings co-operating with said serrations on the flanges of the bushings, the lower end of each side portion being slotted so that parts on opposite sides of the slot can be moved apart to permit angular movement of the arm, and a cotter pin passing through said part and adapted to hold said serrations in mesh.

20. A hitch for coupling a tractor to an implement comprising a first hitch frame adapted to be connected to the tractor and to be raised and lowered in a substantially vertical plane by power operated means on the tractor, the tractor hitch frame having two opposed side portions converging upwardly to an apex, each side portion having an outwardly facing aligning surface, a second hitch frame adapted to be connected to the implement, the implement hitch frame having two opposed side portions converging upwardly to an apex of which of the convergence of the side portions conforms substantially to the convergence of the side portions of the tractor frame, each of the side portions of the implement frame having an inwardly facing aligning surface adapted to receive and overlap the corresponding aligning surface of the tractor hitch frame, a first adjustable attachment fitting at the apex of said implement frame for connection to a first upper attachment point on the implement, second adjustable attachment fittings at the lower end of each side portion of the implement frame for connection to second attachment points on the implement below said first attachment point; projecting means at the apex of the tractor frame adapted to pass through the apex of the implement frame when the tractor frame is inserted into the implement frame and thereafter when the tractor frame is raised relative to the implement frame to guide the implement frame into nesting engagement with the tractor frame with aligning surfaces on the two frames in lapping engagement, pins working through aligned holes adjacent to the lower ends of the side portions of the tractor frame, a lever of substantially wishbone outline having opposed limbs in the free ends of which said pins are carried, said lever being angularly movable about the pins as an axis, cam means carried by said lower ends of the side portions of said tractor frame for co-operation with the limbs of said lever, said pins being movable in opposite directions and received in holes in the lower ends of the side portions of said implement frame in alignment with the holes in the tractor frame when the frames are in nesting engagement to connect the lower ends of the side portions of the frames, the pins being moved by angular movement of the lever about the pins and the co-operation of the limbs of the lever with the cam means.

21. A hitch as claimed in claim 20, wherein said first attachment fitting at the apex of said implement frame comprises a pair of rearwardly extending spaced plates secured to the frame between which is received the first upper attachment point on the implement, a removable pin passing through said attachment points and through vertical slots in the plates.

22. A hitch as claimed in claim 20, wherein said lower attachment fitting comprises rearwardly extending plates secured to the inner faces of the lower end of the side portions of the implement frame in which are drilled a series of aligned holes, the places co-operating with said lower attachment points on the implement to which each plate is releasably connected by a detachable pin passing through one of the holes.

References Cited by the Examiner
UNITED STATES PATENTS

| | | | |
|---|---|---|---|
| 2,914,342 | 11/1959 | Silver et al. | 280—461 |
| 3,029,092 | 4/1962 | Stuart | 280—477 |
| 3,074,501 | 1/1963 | Lane | 180—14 |
| 3,195,651 | 7/1965 | Todd | 280—461 |
| 3,220,751 | 11/1965 | Tweedale | 280—461 |

FOREIGN PATENTS
800,810 12/1950 Germany.

LEO FRIAGLIA, *Primary Examiner.*